3,296,160
EPOXY RESINS BASED ON DIPHENOLIC ACID DERIVATIVES

Thomas J. Miranda, Granger, and Herbert R. Herman, South Bend, Ind., assignors to The O'Brien Corporation, South Bend, Ind., a corporation of Indiana
No Drawing. Filed Nov. 8, 1961, Ser. No. 150,869
17 Claims. (Cl. 260—18)

This invention relates to the preparation of resins suitable for coating compositions made by the reaction of alkyl esters of diphenolic acid and resins having epoxy groups therein. More specifically, this invention relates to resins and the process of producing such resins by the reaction of diphenolic acid alkyl esters with compounds having epoxy groups therein and then with drying oil fatty acids or their equivalents.

Diphenolic acid, sometimes referred to herein as DPA, has the more specific name 4,4-bis(p-hydroxy-phenyl)-n-pentanoic acid. This compound is prepared by the condensation of two moles of phenol with levulinic acid. Alkyl esters suitable for use in the practice of this invention are made from this acid and its nuclear substituted chloro and bromo derivatives by using standard esterification procedures.

While various attempts have been made, in view of the three functional groups in this compound, to use diphenolic acid as a starting material for the preparation of resins suitable for coating compositions, it has been found that such products do not have the desired resistance to alkali and various other chemicals. This is believed to be due to the fact that the phenolic hydroxy groups are not completely reacted or that they form derivative groups which are unstable in the presence of alkali and various other chemicals. For example, attempts to couple together two or more diphenolic acid molecules through the carboxylic acid group results in a bulky product apparently of such three-dimension character that not all of the phenolic hydroxy groups are reacted. Consequently, if these remain unreacted or are reacted with drying or fatty acids, the resultant product has poor alkali resistance.

In accordance with the present invention, it has now been found possible to make resins particularly suitable for coating compositions, and various other uses, by the reaction of the alkyl esters of diphenolic acid, or the corresponding derivatives in which from 1 to 4 positions on the phenylene radicals are occupied by chlorine or bromine. The alkyl groups used in preparing these esters can have as high as 30 carbon atoms although the smaller alkyl groups, that is those having no more than about 15 carbon atoms, are preferred.

In the process of this invention, the diphenolic acid ester or one of the derivatives indicated, is reacted with a compound having two oxirane groups therein. Such compounds can be represented by the formulas

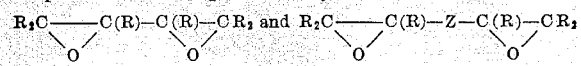

wherein R is hydrogen or an alkyl group as defined above, Z is a divalent hydrocarbon radical or a divalent radical having only hydrocarbon and ether and/or hydroxy oxygen portions therein with the oxygen portions at least one carbon atom removed from each of the valence bonds by which Z is attached to the adjoining carbon atoms of the formula. Z can be aromatic, aliphatic, cycloaliphatic and can include ethylenic or acetylenic or spiro structures therein. Typical divalent hydrocarbon groups that can be represented by Z or contained as a part thereof are methylene, tetramethylene, hexamethylene, phenylene, cyclohexylene, tolylene, xylylene radicals and various combinations connected directly or through ether groups, and derivatives thereof having ether and hydroxy derivative groups therein.

After this reaction has proceeded to the point where substantially all of the phenolic hydroxy groups have reacted with an oxirane group, an ethylenically unsaturated fatty acid, such as a drying oil fatty acid or semi-drying oil fatty acid or the equivalent thereof, e.g. various esters, anhydrides, acid chlorides, etc., is reacted to esterify the aliphatic hydroxyl groups or epoxy groups remaining in the reaction product. The resultant products have been found to give improved properties to coatings and other compositions including improved resistance to alkali and various other chemicals, toughness, etc.

The diphenolic acid esters can be prepared by standard methods for preparing esters using the alcohols, esters or other equivalent materials containing the desired alkyl group for substitution on the carboxylic acid group of the DPA or nuclear halogenated derivatives. If desired, the diphenolic acid can be converted to the corresponding acid chloride before reaction with alcohol. Moreover, an ester of the desired alkyl group can be used and the alkyl group attached to the carboxylic acid group of the DPA by ester interchange.

Typical alkyl esters of the diphenolic acid and nuclear halogenated derivatives that can be used in the practice of this invention, include but are not restricted to: the methyl, ethyl, propyl, butyl, amyl, hexyl, heptyl, octyl, nonyl, decyl, dodecyl, tetradecyl, hexadecyl, nonadecyl, eicosyl, cyclohexyl, cycloheptyl, cyclohexylethyl, methylcyclohexyl, etc.

Unsaturated fatty acids that can be used include the drying oil fatty acids and semi-drying oil fatty acids, preferably those having at least 10 carbon atoms and no more than about 25 carbon atoms therein. Typical unsaturated fatty acids include, but are not restricted to: undecylenic acid, myristolenic acid, palmitolenic acid, etc., and the fatty acids from linseed oil, oiticica oil, tall oil, tung oil, dehydrated castor oil, isano oil, perilla oil, fish oil, hempseed oil, chia oil, poppyseed oil, soy bean oil, safflower oil, sunflower oil, walnut oil, etc. These can be used in the form of the acid itself or equivalent material such as acid chloride, esters, etc. to effect the esterification.

Monomeric epoxy compounds which can be used to react with the phenolic hydroxy groups are those which have two oxirane radicals therein. Typical oxirane compounds that can be used include, but are not restricted to: the diglycidyl ether of bisphenol, the diglycidyl ether of resorcinol, the diglycidyl ether of dihydroxy diphenyl, divinyl benzene diepoxide, diglycidyl benzene, butadiene diepoxide, isoprene diepoxide, the diepoxide of hexadiene-1,5, diglycidyl ether, divinylcyclohexane diepoxide, diglycidyl ether of dihydroxy cyclohexane, the diglycidyl ethers of ethylene glycol, propylene glycol, butylene glycol, diethylene glycol, triethylene glycol, etc.

Polymers containing at least two oxirane groups therein can also be used for this purpose such as polymers, preferably linear polymers, of the various diglycidyl ethers listed above in which there is a terminal glycidyl group at each end of the polymer molecule, such as for example, those having the formula

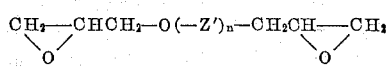

wherein the Z' is a repeating unit whose structure depends on the particular dihydroxy material to which the diglycidyl groups are attached in the monomeric material, and n has a value of 2–20 depending on the size of the polymer molecule. Such polymers can be prepared by standard polymerization methods from the above-listed di-oxirane monomeric compounds, and also from other similar compounds.

The Z' radical in the above formula has a structure derived from that in the monomeric compound. For example when linear polymers are prepared by polymerization of the diglycidyl ether of bisphenol, the polymer structure can be represented by the following formulas or by a structure in which both of the repeating units within the brackets are present in the same polymer molecule.

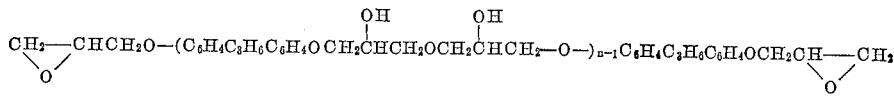

or

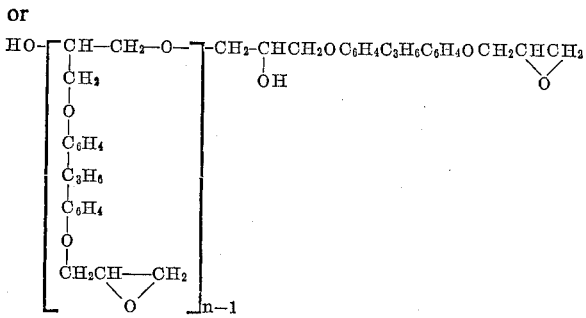

In each case Z' here is the repeating unit portion within the bracket or parentheses. In the first of these two formulas Z' is hydrocarbon except for the ether oxygen and hydroxyl groups and in the second formula Z' is hydrocarbon except for the ether oxygen and the oxirane groups.

The bisphenol referred to herein is well known in the art and is more specifically identified as 2,2-bis(p-phenylol)-propane.

When the polymer is derived from divinylbenzene diepoxide, the linear polymer has one or both of the repeating unit formulas shown in the following formulas:

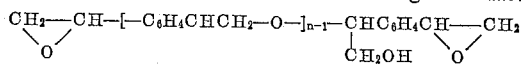

and

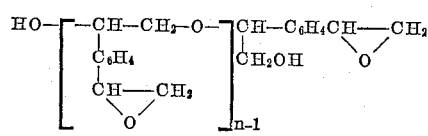

Therefore Z is defined as a divalent radical consisting of hydrocarbon radicals and at least one oxygen group selected from the class consisting of ether, hydroxyl and oxirane groups.

Such polymeric materials can be represented by the following general formulas depending upon which monomeric oxirane compound is used:

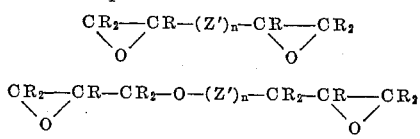

In these formulas, Z' and $n$ are as defined above, and R is preferably hydrogen but can also be an alkyl group as defined above, preferably a lower alkyl such as methyl, ethyl, propyl, etc., and it is preferred that the two R groups of an oxirane radical total not more than 10 carbon atoms. As shown above, the Z' in a particular formula need not have the identical structure in every repeating unit.

The invention is best illustrated by the following examples. These are merely for illustrative purposes and are not intended in any way to limit the scope of the invention nor the manner in which the invention may be practiced. Unless specifically indicated otherwise, parts and percentages are given by weight.

*Example I*

A mixture of 158 parts of the methyl ester of diphenolic acid (hereinafter sometimes referred to as DPAM) and 200 parts of monomeric diglycidyl ether of bis-phenol is heated with stirring to 120° C. under a blanket of nitrogen in a reactor equipped with a reflux condenser. As the temperature is increased, a clear solution is obtained. After the temperature is maintained at 120° C. for one hour, a sample drawn from the reaction mixture forms a clear pill on cooling and upon testing shows that there is no unreacted DPAM present. The condenser is then equipped with a water-separating trap and 148.2 parts of tall oil fatty acid and 20 parts of xylene are added to the reaction mixture. The mixture is then heated and held at 232° C. for 4½ hours with water being removed as it is collected. The reaction product is thereafter cooled and then diluted with xylene to a 50% concentration of non-volatile material. The acid number is determined to be 5.32. The above solution is further diluted to a 25% non-volatile concentration with a mixture of butanol, naphtha and toluene and a mixture of driers added so that the resultant solution as a drier content of 0.15% zirconium naphthenate, 0.05% cobaltnaphthenate, and 0.10% calcium naphthenate based on the tall oil content. Steel panels are dipped coated with this material and dried by baking at 300° F. for 30 minutes. The resultant film has excellent adhesion, high gloss and is very resistant to marring and to xylene.

*Example II*

The procedure of Example I is repeated a number of times with similar results using respectively in place of the methyl ester of diphenolic acid an equivalent amount of, (1) the ethyl ester of DPA;
(2) the butyl ester of DPA;
(3) the tetrachloro derivative of the methyl ester of DPA;
(4) the tetrabromo derivative of the ethyl ester of DPA;
(5) the cyclohexyl ester of DPA.

*Example III*

The procedure of Example I is repeated a number of times with similar results using respectively in place of the tall oil fatty acid:

(1) dehydrogenated castor oil fatty acid;
(2) oiticica oil fatty acid;
(3) linseed oil fatty acid.

*Example IV*

The procedure of Example I is repeated a number of times with similar results using respectively in place of the di-oxirane compound an equivalent amount of:

(1) a polymer of the diglycidyl ether of bisphenol having a viscosity of 130 poises and an epoxy equivalent of 185;
(2) a polymer of the diglycidyl ether of bisphenol having 9 poises and an epoxy equivalent of 180, and using an equivalent amount of the diphenolic ethyl ester in place of the methyl ester;
(3) monomeric diglycidyl ether of resorcinol;
(4) monomeric diglycidyl ether of dihydroxy diphenyl;
(5) divinyl benzene diepoxide;
(6) diglycidyl benzene;
(7) butadiene diepoxide;
(8) diglycidyl ether;
(9) divinylcyclohexene diepoxide;
(10) diglycidyl ether of dihydroxy cyclohexane;

Example V

A composition is prepared by mixing (1) 80 parts of a 50% solution of the resin of Example I in xylene, and (2) 20 parts of a 50% solution of a melamine-formaldehyde resin in butanol having a Gardner viscosity of L, a specific gravity of 0.97 and acid number of 1. This mixture is reduced to a non-volatile concentration of 25% by adding a solvent comprising 90% xylene and 10% butanol. Metal panels dip-coated with this solution and baked at 320° F. for 30 minutes have a coating of good adhesion, hard finish, good resistance to marring and to xylene, and pass the 28″ pound reverse impact test as measured on a Gardner impact testor. When the coating composition is cured on tin plate and subjected to bending on a ⅛ inch mandrel the coating does not crack or craze. Immersion in 5% caustic for 8 hours does not affect the coating. When these panels are subjected to 5% salt fog for 232 hours they show good gloss retention and show no rust creep at scored areas. Good resistance is also shown upon exposure to a 0.5% solution of detergent at 140° F. for 144 hours.

Example VI

A resin prepared as in Example I and having an acid number of 6.61 is thinned in a high boiling aromatic solvent to a concentration having 50% non-volatile portion therein. To 600 parts of this solution is added (1) 90 parts of a 45% solution of a styrene-butadiene resin (having about 50–50 parts styrene and butadiene therein and having a molecular weight of about 9000) dissolved in a solvent comprising 2 parts isopropanol and 3 parts xylene, (2) 110 parts of a solution of 60% benzoguanamine-formaldehyde polymer dissolved in a solvent comprising equal parts of xylene and butanol, having a specific gravity of 1.04 and an acid number of 0.5, (3) 110 parts of high boiling aromatic solvent, and (4) 100 parts of cellosolve acetate. The resultant mixture is tested as a varnish for lithographic coatings by coating on a tin plate previously washed with solvent, flashing the solvent from the coating and baking at 325° F. for 10 minutes. The coated sheet is formed into a number of cans and tested by filling the cans in each case with a different material: latex paint, a water base floor wax, lemon juice, motor oil, and an automobile wax composition, respectively. In each case, the coating shows very good resistance to the material.

Example VII

A resin is prepared from 158 parts of the methyl ester of diphenolic acid, 200 parts of monomeric diglycidyl ether of bisphenol and 20 parts of toluene. This mixture is heated under a nitrogen blanket for 1½ hours, after which 148 parts of linseed oil fatty acid and 20 parts of xylene are added. Then the mixture is heated to 230° F. and maintained at a temperature of 230–250° C. for 3 hours. The product is then cooled, thinned with xylene to 50% non-volatile concentration, and driers added as used in Example III. This composition is brushed over galvanized metal and air-dried. Then 2 coats of a white house paint are applied over one-half the panel and the panel exposed to weather. After six months exposure, the adhesion is still good and no cracking or peeling is observed as noted in coatings of conventional paints over galvanized metal.

Example VIII

A mixture of 100 parts of the resin of Example I, 250 parts of titanium dioxide, 100 parts of xylene and 2 parts of dispersing agent are pebble milled for 24 hours. To 225 parts of the resultant mixture, there are added 81.25 parts of the melamine resin used in Example IV, 135 parts of xylene and 83 parts of butanol. In the resultant composition, the melamine resin portion represents approximately 20%. The composition has a weight per gallon of 9.53 pounds, viscosity in Ford cup No. 4 of 18 seconds, and a non-volatile content of 46.7%. When sprayed on a steel plate previously treated with iron phosphate, and baked for 30 minutes at 300° F. the resultant adhesion is very good, the tensile hardness is H+, and the reverse impact test is past 10 pounds. This composition is found to be very good for coating exteriors of cans, appliances, etc.

Example IX

A mixture of 80 parts of the methyl ester of the tetrachlor derivative of diphenolic acid in which the chlorine atoms are ortho to the hydroxy groups in the two aromatic nucleii, and 70 parts of monomeric diglycidyl ether of bisphenol is heated for one hour and then 70 parts of soya fatty acid is added. This mixture is heated to 230° C. for four hours, following which the product is cooled and thinned to 50% solids in a solvent comprising 90 parts xylene and 10 parts butanol. After driers, as used in Example III, are added, a coating is applied to a metal panel. After drying, the film is tested with an open flame and found to be self-extinguishing upon removal from the flame. This composition is useful for the preparation of fire-retardant coatings.

Example X

The procedure of Example IX is repeated using an equivalent amount of the corresponding tetrabromo derivative of DPA in place of the tetrachlor derivative. Similar results are obtained.

Example XI

A mixture of 158 parts of the methyl ester of diphenolic acid, 150 parts of monomeric diglycidyl ether of bisphenol, and 50 parts of the monobutyl ether, monoglycidyl ether of bisphenol, and 30 parts of toluene is heated for 1½ hours at 110–120° C. Then 148 parts of tall oil fatty acid and 20 parts of xylene is added, following which the mixture is heated for 3¼ hours at 240° C. The product is cooled and thinned with 500 parts of xylene. The resultant composition has a weight of 8.10 pounds per gallon, an acid number of 6.4, a non-volatile content of 49.1% and a tube viscosity of $X-Y$. A coating applied to a metal plate and subsequently tested, after drying, in 10% sodium hydroxide solution for 24 hours shows no whitening. The coating has a reverse impact test of 12 inch pounds.

Example XII

The diacrylyl ester of diphenolic acid is prepared by reacting 2 moles of acrylyl chloride with 1 mole of DPA in accordance with normal procedures for preparing esters. A uniform mixture of 50 parts of finely divided ammonium perchlorate, and a blend of 0.5 part of the aforementioned diacrylyl ester and 49.5 parts of the resin of Example III is prepared. The resultant mixture is pressed into rods and irradiated in a high energy linear accelerator to effect cure. Upon testing as a solid propellant fuel in a standard specific impulse test for such purpose, this product is found to have a high specific impulse.

In the preceding example, other crosslinking agents such as divinyl benzene, ethylene glycol diacrylate, divinyl phthlate, etc. can be used in amounts of 0.1–10% in place of the diacrylyl ester of DPA, and other means of effecting crosslinking can also be used in place of the irradiation technique used therein. For example, the crosslinking can be grafted by means of a peroxy catalyst or other free radical generating catalyst, or a tri or tetrafunctional epoxy resin can be used in place of the diacrylyl ester and blended with the resin and the perchlorate and subsequently crosslinked under conditions which will promote the polymerization through the epoxy radicals. Furthermore, 50–90% of the perchlorate or other solid inorganic oxidizers such as potassium perchlorate, nitrates, etc., commonly used for solid propellant fuels can be used in such fuel compositions.

The resins of the preceding examples can also be reacted with aldehydes which will effect condensation through the aromatic nuclei. For example, the tall oil esterified resin of Example I (200 parts) is reacted with 2.5 moles of formalin at 85° C. until a uniform solution is obtained, which takes approximately 5-6 hours. The resultant resin is flowed onto steel panels and cured at 275° F. for 30 minutes. A hard, glossy, mar-resistant coating is obtained. Other aldehydes such as acetaldehyde, butyl formcel, etc. can also be used.

The chloro and bromo derivatives referred to above can be prepared by using a chloro- or bromo-phenol in place of the unsubstituted phenol used for condensation with levulinic acid in producing the diphenolic acid. This chloro or bromo derivative should have at least one reactive position open for condensation with the keto group of the levulinic acid. When the para position to the hydroxy group of the phenyl is open, the resultant condensation product is a chloro or bromo derivative of the diphenolic acid. When a position other than this para position is open, the resultant derivative is a derivative of an isomer of diphenolic acid. For example, when 2,6-dichlorophenol is condensed with levulinic acid, the product is a tetrachloro derivative in which the two ortho positions to the hydroxy group in each nucleus is occupied by chlorine. When 2,4-dichlorophenol is used for the condensation, the resultant tetrachloro derivative is an isomer of the first compound. These isomer derivatives are equivalent for purposes of this invention and are intended to be included within the scope of this invention.

Certain features of this invention have been described in detail with respect to various embodiments thereof. However, it will, of course, be apparent that other modifications can be made within the spirit and scope of this invention, and it is not intended to limit the invention to the exact details shown above except insofar as they are defined in the following claims.

The invention claimed is:

1. A coating composition having approximately 50–75 percent by weight of solvent and 50–25 percent by weight of non-volatiles therein comprising the ester reaction product of an ethylenically unsaturated fatty acid having about 10–25 carbon atoms in said acid, with the condensation product of
   (1) a compound selected from the closs consisting of the alkyl esters of 4,4-bis-(p-phenylol)pentanoic acid and the chloro and bromo nuclear-substituted derivatives thereof having no more than 2 of said bromo and chloro atoms substituted per aromatic nucleus therein, said alkyl group having no more than 30 carbon atoms therein, and
   (2) an oxirane compound selected from the class consisting of oxirane compounds having one of the formulas:

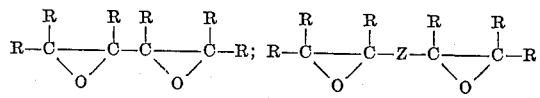

and polymers thereof having no more than about 20 repeating units therein, and having at least 2 of said oxirane groups intact therein, in which formulas R is a radical selected from the class consisting of hydrogen and alkyl radicals the total number of carbon atoms in said R groups in any one of said formulas is no more than 20 carbon atoms, and Z represents a divalent radical having no more than 30 carbon atoms therein selected from the class consisting of divalent hydrocarbon radicals and derivatives thereof having only derivative groups selected from the class consisting of ether and hydroxy derivative groups, said hydroxy and ether derivative groups being at least one carbon atom away from each of the valence bonds by which said Z group is attached to the oxirane radicals of said formulas, said condensation product being formed by the reaction of the hydroxy groups of said 4,4-bis-(p-phenylol)- pentanoic acid compound with said oxirane groups.

2. A composition of claim 1 in which said unsaturated acid is tall oil fatty acid, and said condensation product is the condensation product of said alkyl ester of 4,4-bis-(p-phenylol)-pentanoic acid and monomeric diglycidyl ether of bisphenol.

3. A composition of claim 1 in which said unsaturated acid is linseed oil fatty acid, and said condensation product is the condensation product of said alkyl ester of 4,4-bis-(p-phenylol)-pentanoic acid and monomeric diglycidyl ether of bisphenol.

4. A composition of claim 1 in which said unsaturated acid is tung oil fatty acid, and said condensation product is the condensation product of said alkyl ester of 4,4-bis-(p-phenylol)-pentanoic acid and monomeric diglycidyl ether of bisphenol.

5. A composition of claim 1 in which said unsaturated acid is oiticica fatty acid, and said condensation product is the condensation product of said alkyl ester of 4,4-bis-(p-phenylol)-pentanoic acid and monomeric diglycidyl ether of bisphenol.

6. A composition of claim 1 in which said unsaturated acid is tall oil fatty acid, and said condensation product is the condensation product of said alkyl ester of 4,4-bis-(p-phenylol)-pentanoic acid having 2 chlorine atoms attached to each of the aromatic nuclei of said pentanoic acid derivative and monomeric diglycidyl ether of bisphenol.

7. The process for the preparation of a coating composition comprising the steps of
   (1) condensing at a temperature of at least 110° C. for at least 1 hour a compound selected from the class consisting of alkyl esters of 4,4-bis-(p-phenylol)-pentanoic acid and its chloro and bromo derivatives having no more than 2 of said chloro and bromo atoms substituted in each aromatic nuclei thereof and having no more than 20 carbon atoms in said alkyl group, with a slight excess over molar proportion, based on moles of said ester, of an oxirane compound selected from the class consisting of an oxirane compound having one of the formulas:

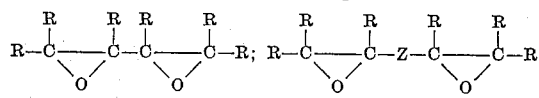

and polymers thereof having at least two of said oxirane rings intact therein and having no more than about 20 monomeric units as repeating units therein, in which formulas R is a radical selected from the class consisting of hydrogen and alkyl radicals the total number of carbon atoms in said R groups in any one of said formulas is no more than 20 carbon atoms, and Z represents a divalent radical having no more than 30 carbon atoms therein selected from the class consisting of divalent hydrocarbon radicals and derivatives thereof having only derivative groups selected from the class consisting of ether and hydroxy derivative groups, said hydroxy and ether derivative groups being at least one carbon atom away from each of the valence bonds by which said Z group is attached to the oxirane radicals of said formulas;
   (2) subsequently esterifing at a temperature of about 230–250° C. for approximately 3–4.5 hours; said condensation product with slightly more than a mole, per mole of said ester, of an ethylenically unsaturated fatty acid having about 10–25 carbon atoms therein; and
   (3) adding sufficient solvent to said esterified condensation product to give a composition having approximately 50–75 percent by weight of solvent and 50–25 percent by weight of non-volatiles therein.

8. A process of claim 7 in which said alkyl ester is one having 2 chlorine atoms attached to each aromatic nuclei of said compound.

9. A process of claim 7 in which said alkyl ester is an alkyl ester of 4,4-bis-(p-phenylol)-pentanoic acid.

10. A process of claim 9 in which said alkyl ester is the methyl ester.

11. A process of claim 7 in which said oxirane compound is monomeric diglycidal ether of bisphenol.

12. A process of claim 11 in which said unsaturated fatty acid is tall oil fatty acid.

13. A process of claim 11 in which said unsaturated fatty acid is linseed oil fatty acid.

14. A process of claim 11 in which said unsaturated fatty acid is tung oil fatty acid.

15. A process of claim 11 in which said unsaturated fatty acid is oiticica fatty acid.

16. A process of claim 9 in which said unsaturated fatty acid is tall oil fatty acid.

17. A process of claim 9 in which said unsaturated fatty acid is linseed oil fatty acid.

References Cited by the Examiner

UNITED STATES PATENTS

| | | | |
|---|---|---|---|
| 2,890,194 | 6/1959 | Phillips et al. | 260—18 X |
| 2,907,723 | 10/1959 | Greenlee | 260—18 |
| 2,907,731 | 10/1959 | Greenlee | 260—831 |
| 2,908,006 | 10/1959 | Greenlee | 260—18 |
| 3,130,096 | 4/1964 | Pruitt et al. | 149—19 |
| 3,155,552 | 11/1964 | Vriesen | 149—19 |

OTHER REFERENCES

Epoxy Resins, Their Applications and Technology, Lee-Neville, McGraw-Hill, N.Y., 1957, p. 286.

LEON J. BERCOVITZ, *Primary Examiner.*

MILTON STERMAN, *Examiner.*

T. D. KERWIN, C. W. IVY, *Assistant Examiners.*